United States Patent [19]

Duke

[11] 4,439,345

[45] Mar. 27, 1984

[54] DEMULSIFICATION OF A CRUDE OIL MIDDLE PHASE EMULSION

[75] Inventor: Roy B. Duke, Littleton, Colo.

[73] Assignee: Marathon Oil Company, Findlay, Ohio

[21] Appl. No.: 272,621

[22] Filed: Jun. 11, 1981

[51] Int. Cl.$^3$ ............................................. B01D 17/04
[52] U.S. Cl. ................................... 252/330; 252/329; 252/340; 252/341; 252/344; 252/8.55 D; 252/358
[58] Field of Search .................. 252/330, 329, 8.55 D, 252/340, 341, 358, 344

[56] References Cited

U.S. PATENT DOCUMENTS 2,828,267  3/1958  De Groote .......................... 252/330
4,089,803  5/1978  Bessler ................................ 252/344

*Primary Examiner*—Josephine Barr
*Attorney, Agent, or Firm*—Jack L. Hummel

[57] ABSTRACT

The middle phase emulsion of a crude oil emulsion produced by a surfactant flooding of an oil reservoir is demulsified by contacting it with a water-soluble alkali metal hydroxide in an amount and under conditions sufficient to cause the hydrolysis of the middle phase emulsion and its subsequent separation into phases, wherein one of the phases is primarily an oil phase. The oil phase is then separated and, thereafter, can be further demulsified by demetalizing the oil by contacting it with a carboxylic acid or an amine salt of a carboxylic acid. It may be desirable to concurrently or subsequently treat the oil with an organic base, which can also be an amine demulsifier, to obtain a pH of from about 7 to about 9 in the final oil phase recovered from the acid demetalization step.

15 Claims, No Drawings

DEMULSIFICATION OF A CRUDE OIL MIDDLE PHASE EMULSION

DESCRIPTION

1. Technical Field

The invention relates to a demulsification process and particularly a demulsification process of the middle phase emulsion of a crude oil emulsion produced by surfactant flooding of the reservoir.

2. Background Art

Due to the gradually declining production of crude oil in the United States of America, a number of enhanced oil recovery (EOR) projects have been undertaken to stimulate production from known oil fields that are beyond their economic recovery limit. One of these EOR methods injects a surfactant into the reservoir which lowers the oil-brine interfacial tension and allows more oil to be produced. Such processes are commonly known as micellar, micellar-polymer, surfactant or surfactant-polymer floods.

Although surfactant flooding systems have proved successful in recovering additional oil, they have also introduced problems which have heretofore not been encountered. Foremost among these is that the produced oil is an emulsion caused by the surfactants, cosurfactants and polymers used in surfactant floods utilized in secondary and tertiary recovery processes for oil.

Fluids produced by the flooding of a reservoir with a surfactant flood generally consists of three phases each of which is an emulsion comprised of surfactant, brine and oil. The amounts of the three phases, relative to one another, change throughout the course of the flood.

The upper phase emulsion (UPE) consists largely of oil and is stabilized by oil-soluble surfactants. It can contain as much as 12 percent water and surfactants; however, this total is generally less than about 5 percent.

The middle-phase emulsion (MPE) is a mixture of about equal quantities of oil and brine. It is stabilized by divalent ion surfactants, e.g., sulfonates, and the polymer, e.g., polyacrylamide, used for mobility control of the flood.

The lower-phase emulsion (LPE) is largely brine. It is stabilized by water-soluble surfactants and also contains salts. Additionally, it may contain as much as 5 percent oil in addition to a water-soluble polymer. The UPE is a water-in-oil microemulsion; the LPE is an oil-in-water microemulsion; and the MPE is a macroemulsion.

The three emulsion phases can be separated by allowing the produced fluids to stand quiescently. If acceleration rates are desired, demulsifiers may be added or the fluid can be centrifuged. The addition of economically attractive amounts of demulsifiers, i.e., less than about 0.5 percent by weight based on the weight of the oil, do not significantly alter the volumes of the compositions of the three emulsion phases from comparable values obtained by quiescent standing in the absence of demulsifiers. In the continuous flow systems utilized in field separations, the accelerated rate of separation achieved by appropriate demulsifiers is beneficial and in most cases is mandatory.

Because of the diverse nature of the three emulsion phases, no single demulsifier or combination of demulsifiers has been discovered which will demulsify all three phases simultaneously. In fact, it is not uncommon to find that the demulsifiers behave antagonistically toward one another. For example, a particular demulsifier may excel in separating an oil-in-water emulsion, but when added to a water-in-oil emulsion, it may have the opposite effect and aid in stabilizing the emulsion. In short, none of the prior art demulsifiers, which are usually nonionic demulsifiers, are useful in the simultaneous demulsification of all three phases nor are any of them known for their ability to demulsify the middle phase emulsion. U.S. Pat. No. 4,089,803 is representative of a prior art demulsifier and it discloses a demulsifier comprised of a mixture of an oxyalkylated phenolaldehyde resin, a polyethyleneamine and an alkanol amine.

Given the limitation of being able to demulsify only one of the three phases at a time, it is most economical to begin treating the oil-in-water emulsion, i.e., the lower phase emulsion, this phase constitutes about 85–95 percent of the produced fluid. Once demulsified, this phase, consisting of brine and water-soluble sulfonates, can be discarded. This reduces the size of the downstream processing equipment because the sum of the upper and middle phase emulsion constitutes only about 5–25 percent of the produced fluids. The process of the present invention is directed toward the demulsification of the middle phase emulsion.

DISCLOSURE OF THE INVENTION

Oil is recovered from the middle phase emulsion of a crude oil produced by a surfactant flood, by hydrolysis followed by further demulsification by demetalization. The demetalization step is utilized when the oil recovered from the hydrolysis step will be exposed to water. Since the demetalization step uses a carboxylic acid, it is sometimes desirable to concurrently or subsequently treat the oil with an organic base to obtain a pH of from about 7 to about 9.

The process of the present invention is useful in the demulsification of crude oil macroemulsions produced by surfactant floods utilized in secondary and tertiary oil recovery techniques. The invention is particularly beneficial in the treatment of such emulsions produced by micellar or micellar-polymer flooding of oil reservoirs.

The term micellar or micellar dispersion is intended to encompass flooding with systems of the type taught by H. J. Hill, J. Reisberg, and G. L. Stegemeier, *J. Pet. Tech.*, 186 (Feb., 1973), wherein relatively dilute aqueous solutions of surfactant and/or cosurfactant are injected; the process of R. L. Reid, et al, in U.S. Pat. No. 3,885,628, wherein a multiphase system is injected; and U.S. Pat. No. 3,082,822 to L. W. Holm, et al, wherein substantially small slugs of anhydrous soluble oils are alternately injected with small slugs of water or other aqueous media; U.S. Pat. No. 3,682,247 to Jones; U.S. Pat. No. 3,687,201 to Son, et al; U.S. Pat. No. 3,740,343 to Jones, et al; U.S. Pat. No. 3,956,372 to Coleman, et al; U.S. Pat. No. 3,964,548 to Schroeder, et al; U.S. Pat. No. 3,997,451 to Plummer, et al; and U.S. Pat. No. 4,013,125 to Plummer, et al.

Oil produced from secondary or tertiary production may contain ionic surfactants, such as petroleum, crude oil, alkylaryl, or alkyl sulfonates; alkyl or aryl carboxylates; naturally occurring naphthenates or tetraalkylammonium salts; nonionic surfactants, such polyoxyalkylated alcohols, phenols, or alkylated phenols, or alkylcarboxyamides; cosurfactants, such as alcohols, polyoxyalkylated alcohols or phenols, or alkyl sulfates; polymers, such as polyacrylamide or nonionic biopolymers;

hydrocarbons such as crude oil, shale oil, coal liquefaction products, gas oils, or other petroleum fractions; and brine, containing inorganic cations from Groups IA and IIA and the transition metal series of the periodic table of the elements, and anions, such as a halide, sulfate, sulfite, carbonate, bicarbonate, nitrate, etc. The emulsions may also contain other compounds commonly used, such as biocides and anticorrosives.

Hydrolysis of the MPE is effected by treating it with a water-soluble hydroxide. The alkali metal hydroxides are particularly useful. The rate of hydrolysis can be accelerated by heating the mixture accompanied by good mixing as well as by the addition of a small amount of hydrogen peroxide or tetraalkylammonium salts. The final separation of the phases produced by the hydrolysis treatment can be facilitated by dilution with water.

Both before and immediately after the addition of the hydroxide, the MPE, although homogeneous, is not a true solution and is best described as a macroemulsion. Treatment of the MPE with a water-soluble, metallic hydroxide, such as sodium hydroxide, causes the color to change from either gray or black to tan to brown depending upon whether additional water is added to dilute the mixture.

The rate at which the MPE separates after treatment with hydroxide is directly related to the color change, i.e., the darker the color, the more complete the separation. Upon standing quiescently after the treatment with hydroxide, the color of the MPE becomes increasingly darker and after a few hours, two distinct phases appear. The upper phase is largely oil and the lower phase is a strongly basic brine containing sulfonates. If the MPE has not been diluted, these two phases are roughly equal in volume and account for more than 90 percent of the total fluid. A third phase usually appears at the oil-brine interface. The oil and brine phases are generally black in color and the third phase is a reddish brown color. The hydroxide level in the MPE will decrease for a period of several hours before becoming constant.

After complete separation has occurred, it is not possible to physically reverse the reaction to obtain the homogeneous macroemulsion. It is thought that the hydroxide treatment results in a slow, irreversible hydrolysis reaction. The irreversible nature of the reaction is evidenced by the fact that the original macroemulsion will not reform upon mixing the hydroxide-treated MPE after it has completely separated. Furthermore, the subsequent oil-brine separation after remixing is fast rather than slow as it was originally, when the hydroxide was added to the MPE. It is thought that a hydrolysis reaction is occurring due to the fact that hydroxide is consumed in the course of the reaction, heating accelerates the reaction rate, which is common in hydroxide-catalyzed hydrolyses, and quaternary ammonium salts and hydrogen peroxide, both of which are hydrolysis catalysts, also accelerate the reaction.

It is thought that the constituents largely responsible for the stabilization of the MPE are alkaline earth sulfonates and the mobility control polymers, e.g., polyacrylamides, utilized in the flood. The presence of polyacrylamide in the MPE is suggested by elemental analyses and infrared spectrum of the emulsion. The hydrolysis of polyacrylamides to polyacrylates and the conversion of alkaline earth sulfonates to alkali metal sulfonates accounts for the consumption of hydroxide in the reaction.

Another component which may be responsible for stabilizing the MPE are sulfonamides which are also subject to hydroxide-promoted hydrolysis. Hydrolysis of the sulfonamides converts them to sodium sulfonates which would also consume hydroxide.

During the flooding of the reservoir, alkaline earth sulfonates are formed by a cationic exchange with reservoir ions. The addition of hydroxide to alkaline earth sulfonates causes another cationic exchange yielding alkali metal sulfonates which are markedly more water soluble than their precursors. The driving force behind this reaction is the insolubility of the alkaline earth hydroxides. This reaction also consumes hydroxide.

Hydroxides also cause cationic exchanges with the ammonium sulfonates and salts in the MPE. Again, alkali earth metal sulfonates are markedly more water soluble than their ammonium counterparts and this destabilizes the emulsion. The driving force behind this particular reaction is the affinity of the hydroxide ion for a proton.

Although the above represents possible explanations of the effect of the hydroxide on the MPE, it is possible that other reactions are occurring that either influence or control the separation of the oil from the brine. It should, therefore, be noted that the invention lies in the use of a hydroxide and the results it produces, not in its mechanism. Thus, the term "hydrolysis" as used herein refers to the addition of a hydroxide to an emulsion and the results it produces irrespective of its mechanism of action.

The oil obtained from the hydrolysis of the MPE usually contains less than about 1 percent by weight water and can be used for burner fuel and other unrefined applications. The oil obtained from the hydrolysis of the MPE, which will not pass a simulated desalter test, will form an emulsion upon its exposure to water due to the fact that it contains metallic ions. The principle metal ions are magnesium, calcium, sodium and iron. Therefore, it is necessary to further treat the oil prior to exposing it to water or subjecting it to a refinery process. However, the treatment of the oil produced from the hydrolysis of the MPE with conventional demulsifiers or with the polyalkyloxyamines of my copending application, "Polyalkyloxyamines as Demulsifiers", Ser. No. 272,454 now U.S. Pat. No. 4,384,977, filed concurrently herewith and described herein will not significantly improve the quality of this oil when used alone.

Thus, the oil obtained from the hydrolysis of the MPE is treated with a water soluble carboxylic acid or amine salt of such an acid. Sufficient carboxylic acid is added to lower the pH of the brine in equilibrium with the oil to a value of 8 or less. This renders the metallic ions water soluble.

The particular carboxylic acid utilized in the demetalization step is limited to ones that are water soluble. Additionally, the carboxylic acid should be able to form water soluble salts or complexes with the multivalent metallic ions which are contained in the oil. Polybasic carboxylic acids, such as citric acid, are particularly useful.

Following treatment of the hydroxide treated oil with the carboxylic acid, the mixture is allowed to separate. Demulsifiers such as those described in copending patent application, "Polyalkyloxyamines as Demulsifiers", Ser. No. 272,454 now U.S. Pat. No. 4,384,977, filed concurrently herewith and described herein, accelerate the rate of this separation and minimize the formation of an interfacial phase containing both brine and oil. The brine and interfacial phase are then separated from the oil phase. Therefore, the oil phase can be transported and/or subjected to refinery processes.

The use of carboxylic acids or their amine salts to obtain the final oil phase may result in the oil phase having an acidic character. Thus, the oil can produce a corrosive environment and water which is utilized in the washing of the oil will obtain a similar pH. For example, if the aqueous phase in equilibrium with the demulsified oil has a pH of 4.0, subsequently washing the oil with water will produce a brine having a pH of about 4. Therefore, it is usually desirable to neutralize the brine, which is in equilibrium with the oil, to obtain a pH of about 7.0 to about 9.0 which results in a relatively non-corrosive oil.

The neutralization is accomplished by the addition of water-soluble amines. Examples of particularly useful amines include mono-, di-, and triethanol amine, morpholine, pyridine, ethylenediamine, polyoxyethyldiamines, polyoxypropyldiamines, polyoxybutyldiamines, polyethyleneamines and by-product amines such as Jefferson Amine C-6 and Jefferson Amine C-12. The Jefferson Amines are produced by the Jefferson Chemical Co., a subsidiary of Texaco, Inc. Jefferson Amine C-6 is a mixture whose principal ingredients are aminoethoxyethylmorpholine and hydroxyethoxyethylmorpholine. Jefferson Amine C-12 is a mixture whose principal ingredients are bis-(aminoethyl)ether and methoxyethylmorpholine.

These same type of amines utilized for neutralization can be combined with the carboxylic acid to form an amine salt of the acid which is then used for the demetalization of the oil phase of the hydrolysed MPE. The use of a carboxylic acid amine salt may reduce or eliminate the need for neutralization of the resulting oil phase.

The use of a metallic hydroxide for neutralizing the demulsified oil should be avoided since they will cause the reformation of metallic salts and the reformation of an emulsion upon the exposure of the oil to water or brine.

PREFERRED EMBODIMENTS FOR CARRYING OUT THE INVENTION

Although good oil recoveries can be attained by simply treating the MPE with a metallic hydroxide and allowing the mixture to slowly separate, the yields can be significantly improved and the separation time shortened if the mixture is heated with good agitation for several hours prior to separation. The preferred reaction temperatures range between about 75° and about 400° F., more preferably between about 100° and about 250° F., and most preferably between about 120° and about 200° F.

The preferred metallic hydroxide for separating the MPE is sodium hydroxide. Potassium hydroxide can be also used; however, the oil recoveries are not as good and the resulting oil is more difficult to demulsify. Lithium hydroxide is ineffective as are calcium and magnesium hydroxides.

The preferred hydroxide concentrations, based on volume of MPE, range between about 0.05-5.0 weight percent, more preferably about 0.1 and about 2.0 weight percent, and most preferably between about 0.2 and about 1.0 weight percent. The preferred dilution with water, based on volume of MPE, ranges from about 0.1 to about 10 volume percent, more preferably from about 0.2 to about 5 volume percent and most preferably from about 0.3 to about 1.0 volume percent. Much higher amounts of water, e.g., 50-100 volume percent, can be utilized without adversely affecting the hydrolysis demulsification step.

Hydrogen peroxide and tetraalkylammonium salts may be used to accelerate the rate of separation of the oil during the hydrolysis step. The preferred concentration of hydrogen peroxide, based on the volume of MPE, ranges between 0.01-3.0 weight percent, more preferably between 0.02-2.0 weight percent, and most preferably between 0.05-1.0 weight percent.

The preferred tetraalkylammonium salts contain one alkyl group containing 6-25 carbon atoms; the other three alkyl groups are methyl groups. Preferably, the single alkyl group other than the methyl group, contains between 10-20 carbon atoms and more preferably between 12-18 carbon atoms.

The preferred concentrations of the tetraalkylammonium salts, based on the volume MPE, range from about 0.005 to about 3.0 weight percent, more preferably from about 0.01 to about 1.0 weight percent, and most preferably from about 0.02 to about 0.50 weight percent.

The preferred acidic component of the demulsifiers utilized in the demetalization step are polybasic carboxylic acids such as tartaric, mucic, citric, ethylenediaminotetracetic, or nitrilotriacetic acids. Monobasic acids, such as gluconic, lactic, glycolic, and acetic, are also useful. The carboxylic acids are preferably water soluble. Di- and tribasic mineral acids, such as sulfuric and phosphoric acids, may also be used. The most preferred acids are capable of forming water-soluble complexes with the metallic ions.

The amines used to form salts with acids are also preferably water soluble. The preferred amines are mono-, di-, and triethanol amine, morpholine, ethylenediamine, polyethyleneoxyamines, polypropyleneoxyamines, polybutyleneoxyamines, and the polyethyleneamines, such as diethylenetriamine. By-product amines such as Jefferson Amine C-6 and Amine C-12 are also useful.

The most preferred amines for either forming an amine salt of the carboxylic acid or for demulsification of an acid or aqueous wash of the oil after hydrolysis are polyalkyloxyamines which are defined in formula I.

$$R_1\text{-}[(OA_1)_{\overline{m}}OA_2N]_n \qquad (I)$$

where $R_1$ is hydrogen, or an alkyl, aryl, or alkylaryl group, or a heterocyclic group. The alkeneoxy group, $-OA_1-$, is derived from an alkylene oxide such as ethylene oxide, propylene oxide, butylene oxide, 2-butylene oxide, isobutylene oxide and the like, such as:

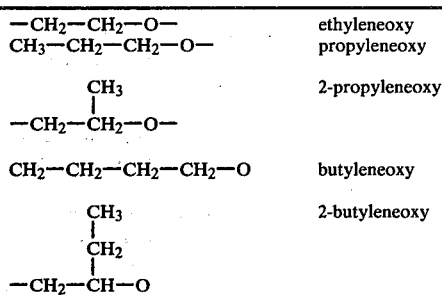

| $-CH_2-CH_2-O-$ | ethyleneoxy |
| $CH_3-CH_2-CH_2-O-$ | propyleneoxy |
| $-CH_2-CH(CH_3)-O-$ | 2-propyleneoxy |
| $CH_2-CH_2-CH_2-CH_2-O$ | butyleneoxy |
| $-CH_2-CH(CH_2CH_3)-O$ | 2-butyleneoxy |

-continued

| | |
|---|---|
| $CH_3\ CH_3$<br>$\|\quad\ \|$<br>$-CH-CH-O-$ | 2-butyleneoxy |
| $CH_3$<br>$\|$<br>$-CH_2-CH-O-$<br>$\|$<br>$CH_3$ | isobutyleneoxy | and $-OA_2N$ is a nitrogen-containing alkyleneoxy group such as:

| | |
|---|---|
| $CH_3$<br>$\|$<br>$-O-CH_2-CH-NH_2$ | 2-amino-propyleneoxy |
| $-O-CH_2-CH_2-CH_2-NH_2$ | 3-amino-propyleneoxy |
| $CH_3$<br>$\|$<br>$-O-CH_2-CH-NH-CH_3$ | 2-(methyl-amino)-propyleneoxy |
| $CH_3$<br>$\|$<br>$-O-CH_2CH-N-(CH_3)_2$ | 2-(dimethyl-amino)-propyleneoxy |
| $CH_3$<br>$\|$<br>$-O-CH_2-CH-NH-CH_2-CH_2-CH_2-NH_2$ | 2-(cyano-ethylamino)-propyleneoxy |
| $CH_3\quad\ \ CH_2-CH_2$<br>$\|\quad\quad /\quad\quad\quad\ \ \backslash$<br>$-O-CH_2-CH-N\quad\quad\quad\ \ O$<br>$\quad\quad\quad\quad\ \ \backslash\quad\quad\quad /$<br>$\quad\quad\quad\quad\quad CH_2-CH_2$ | 2-(N—morpholyl)-propyleneoxy |
| $CH_3\quad\ \ CH=N$<br>$\|\quad\quad /\quad\quad\ \ \|$<br>$-O-CH_2-CH-N\quad\quad\ \ \|$<br>$\quad\quad\quad\quad\ \ \backslash\quad\quad\ \|$<br>$\quad\quad\quad\quad\quad C=CH$ | 2-(N—imidazolyl)-propyleneoxy |
| $CH_3\quad\quad\ \ O$<br>$\|\quad\quad\quad\quad\ \|$<br>$-O-CH_2-CH-NH-C-NH_2$ | 2-(ureido)-propyleneoxy |
| $CH_3$<br>$\|$<br>$-O-CH_2-CH-NH-CH_2-CH_2-OH$ | 2-(hydroxy-ethylamino)-propyleneoxy |
| $-O-CH_2-CH_2-NH_2$ | aminoethyl-eneoxy |
| $CH_3$<br>$\|$<br>$CH_2$<br>$\|$<br>$-O-CH_2-CH-NH_2$ | 2-amino-1-butyleneoxy |
| $CH_3$<br>$\|$<br>$-O-CH_2-CH-N(CH_2-CH_2-OH)_2$ | 2-[bis(hydroxyethyl)]-aminopropyl-eneoxy; |

$A_1$ and $A_2$ may be the same or different alkyls;

n is an integer having a value of at least one which denotes the number of $-OA_1OA_2N$ groups attached to $R_1$;

p is zero or an integer denoting the number of $-(OA_1)-$ units in each of the n groups attached to $R_1$; and i is a subscript for distinguishing between the individual p's in each of the n groups attached to $R_1$.

Some commercially available compounds that belong to formula I are shown in Table I along with their corresponding tradenames. These are produced by the Jefferson Chemical Co., a subsidiary of Texaco, Inc. The number contained within the name of the Jeffamine is indicative of that particular compound's average molecular weight.

Preferably, the carboxylic acid-amine salt demulsifiers are prepared prior to their addition to the oil using water as the solvent. However, they can be prepared in situ by adding the polybasic acid, the amine, and water to the oil in the proper proportion and mixing until complete reaction has occurred.

In the preparation of the amine carboxylates, preferably only about one equivalent of the amine is added to a mole of the polybasic acid so as to form the monoamine salt of the acid. For example, in the preparation of triethanolamine monocitrate, one mole (or one nitrogen equivalent in this case) of the amine is added to one mole of citric acid. In the case of the amine monocitrates, each molecule still has two exchangeable protons to react with the basic substances in the oil.

Water is the preferred solvent for the amine carboxylates; however, if the salts are prepared prior to the addition to the oil and are not completely water soluble, cosolvents such as alcohols, glycols, polyoxyethylene glycols and ethers, and the like may be used to give homogeneous solutions.

In conjunction with or subsequently to the polybasic carboxylic acids and/or their amine salts, demulsifiers, such as the polyalkyloxyamines, e.g., polyethyleneoxyamines, polypropyleneoxyamines and polybutyleneoxyamines, which are described in copending application, "Polyalkyloxyamines as Demulsifiers", Ser. No. 272,454 now U.S. Pat. No. 4,384,977, filed concurrently herewith and described above facilitate the oil brine separation. Preferably, demulsifiers of this type are added in concentration of 100–5000 parts per million (ppm), more preferably at concentrations of 200–2000 ppm, and most preferably at concentrations of 250–1250 ppm, based on oil being treated.

Preferably, the polybasic carboxylic acids or polybasic carboxylic acid-amine salts are added to the hydroxide treated oil until the pH of the aqueous phase in equilibrium with the oil has a pH of 5–9. More preferably, the pH is adjusted between 6–8 and most preferably between 6.5 and 7.5.

However, if the brine in equilibrium with the oil following demulsification is acidic, the oil is treated with a water-soluble amine and more water. After this treatment, the pH of the water is preferably between about 6 and 9, more preferably between 6.5 and 8, and most preferably between 6.8–7.5. Water-soluble amines particularly useful for neutralizing the oil include, mono-, di-, and triethanolamine, morpholine, pyridine, polyalkyoxyamines, e.g., ethylenediamine, polyoxyethyldiamines, polyoxypropyldiamines, polyoxybutyldiamines, polyethyleneamines, and by-product amines such as Jefferson Amine C-6 and Amine C-12.

EXAMPLES

The MPE emulsions utilized in the following examples were obtained from a micellar-polymer flooding of a sandstone oil reservoir located in Crawford County, Ill. The reservoir had been previously water flooded. Crude oil sulfonates produced by sulfonating Illinois crude oil followed by neutralizing with ammonia were used as the surfactant in the flood and the cosurfactant utilized in the flood were alcohols or ethoxylated alcohols.

The floods were conducted by introducing 10 percent of a pore volume of a micellar-dispersion slug containing about 2.5 weight percent of active sulfonate groups (ASG=—SO$_3$NH$_4$), about 0.5–1.5 weight percent cosurfactant, about 5–15 weight percent crude oil and other hydrocarbons, about 2.0–4.0 weight percent of a mixture of inorganic salts, predominately ammonium sulfate and ammonium sulfite, and the remainder water. The slug was followed by a 10 percent of a pore volume of about 1200 ppm polyacrylamide in water, then by less concentrated solutions of the acrylamide polymer, and finally water.

The produced fluid obtained from the reservoir was allowed to stand quiescently for 24 hours after which the resulting three phases were separated. The middle phase emulsion obtained from the separation was utilized in the following examples.

In several examples, a simulated desalter test was utilized to evaluate the quality of oil recovered from the MPE. The simulated desalter test consists of mixing in a blender for 30 seconds, 100 milliliters (ml) of the demulsified oil with 5.0 ml of water and a demulsifier in an amount which is typically used at a refinery. The mixture is then transferred to calibrated tubes and heated to a temperature of from about 160°–200° F. (71°–93° C.) or, if possible, to the actual desalter temperature. After 15 minutes, the volume of brine that has separated is read and recorded as "without coalescence" and reported in the examples simply as WOC.

The sample is then remixed, heated again to the desalter temperature, and subjected to electrostatic coalescence for a period of 15 minutes applying the same AC voltage gradient used in a refinery desalter.

After the electrostatic coalescence, the volume of brine that separates is recorded as "with coalescence" and is reported in the examples as WC. Qualitative comments are also recorded as to the clarity and color of the brine and whether or not a third phase exists at the oil-water interface. The water content of the oil phase is then determined by the Karl Fischer method and recorded. Values below about 0.70 percent indicate that the oil will present no problems in the refinery.

The centrifuge test reported in some of the examples was conducted by mixing in a blender for 30 seconds, 100 ml of oil and 5.0 ml of water at 70°–80° F. (21°–27° C.) and then centrifuging for 15 minutes. The amount of water separated is then recorded as well as comments about its color and clarity. The oil-water interface was also examined for the presence of a third phase. The water content of the oil phase is determined by the Karl Fischer method. Values below about 0.7 volume percent indicate that the oil is pipeline quality.

EXAMPLE 1

Samples of the MPE were diluted with 100 percent water and the pH adjusted with sodium hydroxide to the values shown in Table 1. Hydrogen peroxide, 0.06 volume percent, was added to accelerate the hydrolysis and the mixture stirred for 16 hours at 75° F. (24° C.) after which the oil and hydrolyzate were transferred to a graduated cylinder and the volumetric amount of oil which separated, based on volume of undiluted MPE, was determined and is reported in Table 1.

TABLE 1

Sodium Hydroxide Hydrolysis of MPE
The Effect of pH on Oil Recovery

| Sample | pH | Oil, Volume % |
|---|---|---|
| 1 | 10.0 | 11.0 |
| 2 | 11.0 | 30.4 |
| 3 | 11.5 | 33.4 |
| 4 | 11.5 | 32.4 |
| 5 | 12.0 | 36.0 |
| 6 | 12.0 | 37.2 |
| 7 | 12.5 | 33.8 |
| 8 | 13.0 | 33.4 |

Table 1 shows, at pH's below 11, the recoveries are quite low; however, in the range of 11.5–13.0, they reach a plateau of high, constant values. pH's near 12 appear to be optimum.

As sodium hydroxide is added to the diluted MPE, the initially viscous solution becomes very fluid as the pH is increased from 8 to 10. This is probably due to the conversion of the divalent ion salts of the sulfonates and the partially hydrolyzed polyacrylamides to the monovalent, sodium salts.

EXAMPLE 2

Samples of the MPE were diluted with 50 percent water and stirred for 16 hours with sodium or potassium hydroxide in the amount shown in Table 2 (The volume percent of the hydroxide is based on volume of undiluted MPE). Hydrogen peroxide, 0.12 volume percent, was added to accelerate the hydrolysis. The reactants were then transferred to a graduated cylinder and the volumetric yields of oil, based on volume of undiluted MPE, were determined and are reported in Table 2.

TABLE 2

Effect of the Metallic Hydroxide on the Oil
Recovery from the Hydrolysis of MPE

| Sample | Hydroxide, Volume % | Oil, Volume % |
|---|---|---|
| 1 | KOH, 0.40 | 2 |
| 2 | NaOH, 0.40 | 26.9 |
| 3 | KOH, 0.60 | 2 |
| 4 | NaOH, 0.60 | 34.0 |
| 5 | NaOH, 0.60 | |
| 6 | KOH, 0.80 | 26.8 |
| 7 | KOH, 0.80 | 26.0 |
|   | NaOH, 0.80 | 30.8 |
| 8 | KOH, 1.00 | 26.0 |
| 9 | NaOH, 1.00 | 34.8 |

Table 2 shows that at concentration levels in the range of 0.4 to 1.0 percent, sodium hydroxide gives higher oil recoveries than does potassium hydroxide. The is due primarily to a cation effect. If it were an anion effect, then the recoveries with 0.80–1.0 percent potassium hydroxide would be about the same as those with 0.60 percent sodium hydroxide.

EXAMPLE 3

Samples of MPE were diluted with 100 percent water, mixed with 0.60 volume percent sodium hydroxide based on volume of undiluted MPE, and heated to 140° F. (60° C.) for the reaction times shown in Table 3. No hydrogen peroxide was added to accelerate the hydrolysis. After hydrolysis, the mixture was transferred to a separatory funnel and the volumetric oil yields, based on volume of undiluted MPE, were determined and are reported in Table 3.

TABLE 3

Sodium Hydroxide Hydrolysis of MPE
The Effect of the Reaction Time

| Sample | Reaction Time, hrs. | Oil, Volume % |
|---|---|---|
| 1 | 3 | 42.0 |
| 2 | 6 | 42.0 |
| 3 | 16 | 42.8 |
| 4 | 48 | 41.2 |

Table 3 shows that at 140° F. (60° C.), the oil recoveries are independent of the reaction times between 3 and 48 hours. At lower temperatures, however, reaction time is an important variable because of the slower hydrolysis rates.

EXAMPLE 4

Samples of MPE were diluted with 100 percent water, mixed with 0.60 volume percent sodium hydroxide, based on volume of undiluted MPE, and stirred for 16 hours at the temperatures shown in Table 4. No hydrogen peroxide was added. After hydrolysis, the mixture was transferred to a graduated cylinder and the volumetric oil yield, based on volume of undiluted MPE, was determined and is reported in Table 4.

TABLE 4

Sodium Hydroxide Hydrolysis of MPE
The Effect of Temperature on Oil Recovery

| Sample | Temperature, °F. | Oil, Volume % |
|---|---|---|
| 1 | 75 | 35.6 |
| 2 | 140 | 38.4 |
| 3 | 165 | 39.2 |
| 4 | 165 | 40.0 |

Table 4 shows that oil recoveries increase as the temperature increases within a given reaction period. The higher recoveries are primarily due to rate because the higher temperatures produce faster hydrolysis rates.

EXAMPLE 5

Oil recovered by the sodium hydroxide hydrolysis of MPE was demulsified by mixing with 50 percent water and the amount of citric acid and the demulsifiers shown on Table 5 followed by heating to 100°–140° F. (60° C.). After separating the brine and determining its pH, some of the oil phases were neutralized by mixing with an organic base and demulsifier as indicated in Table 5. The amounts of the reactants, in ppm, is based upon undiluted oil obtained from the hydrolysis. The oil was then subjected to the simulated desalter test and a centrifuge test, the results of which are shown in Table 6.

TABLE 5

Citric Acid Demulsification of Oil Obtained from Hydrolyzed MPE

| | Demulsification | | | Neutralization | |
|---|---|---|---|---|---|
| Sample | Citric Acid (ppm) | Demulsifier (ppm) | pH | Neutralizer (ppm) | Demulsifier (ppm) |
| 1 | 3500 | — | 5.9 | Morpholine (250) | Jeffamine BUD-2000 (1000) |
| 2 | 3500 | Jeffamine BUD-2000 (1000) | 7.1 | no second wash | — |
| 3 | 4000 | Jeffamine BUD-2000 (2000) | 5.4 | no second wash | — |
| 4 | 2000 | Jeffamine BUD-2000 (1000) | 10.2 | Morpholine (250) | — |
| 5 | 3500 | Jeffamine T-403 (1000) | 6.3 | Jeffamine T-403 (250) | — |
| 6 | 3000 | Jeffamine BUD-2000 (1000) | 9.8 | no second wash | — |
| 7 | 3000 | Jeffamine BUD-2000 (1000) | 10.0 | no second wash | — |

TABLE 6

Desalter and Centrifuge Tests

| | | | | Desalter Test | | | | | Centrifuge Test |
|---|---|---|---|---|---|---|---|---|---|
| | | Water | Interface | | | | | $H_2O$, % | $H_2O$, % |
| Sample | pH | Quality | Quality | BC | 5 | 10 | 15 | Before  After | After |
| 1 | 7.3 | clear, colorless | no 3rd phase | t* | 4 | 5 | 5 | 0.38  0.61 | 0.49 |
| 2 | — | hazy, tan | no 3rd phase | t | 2 | 4 | 5 | 0.31  0.65 | 0.42 |
| 3 | — | hazy, tan | no 3rd phase | t | 4 | 5 | 5 | 0.19  0.51 | 0.30 |
| 4 | — | clear, colorless | no 3rd phase | 0+ | 4 | 5 | 5 | 0.54  0.76 | 0.57 |
| 5 | 8.9 | clear, colorless | no 3rd phase | 0 | 3+ | 4+ | 5 | 0.30  0.66 | 0.41 |
| 6 | — | hazy, tan | no 3rd phase | t | 4 | 5 | 5 | 0.54  0.40 | 0.64 |
| 7 | — | clear, colorless | no 3rd phase | t | 4 | 5 | 5 | 0.55  0.42 | 0.64 |

*t = trace

As the results show, demulsification by demetalization can be effected either with or without demulsifiers at pH's ranging from 5.4 to 10.2. Neutralization with morpholine, both with and without a demulsifier, Jeffamine BUD-3000, is demonstrated as well as the use of Jeffamine T-403 as a combination of both neutralizer and demulsifier.

EXAMPLE 6

Jefferson Amine C-6 citrate having a pH of about 4 was prepared by dissolving 40 grams (gm) of citric acid in 100 gm of water and adding Jefferson Amine C-6 until the pH was 4.0±0.2. Sufficient water is then added to bring the total weight of the mixture to about 200 grams.

Oil recovered by the sodium hydroxide hydrolysis of MPE was demulsified by mixing it with 50 percent water and the amounts of Jefferson Amine C-6 citrate and the demulsifiers shown in Table 7 followed by heating the mixture to 100°–140° F. (38°–60° C.). After separating the brine and determining its pH, the oil phase was neutralized by mixing it with 50 percent water and the organic bases and demulsifiers indicated in Table 7. The amounts of reactants, in ppm, is based upon undiluted oil obtained from the hydrolysis. The oil was then subjected to the desalter test, the results of which are shown in Table 8.

water and adding triethanolamine until the pH reached 4.0±0.2. Sufficient water is then added to bring the total weight of the mixture to about 200 gm.

Oil recovered by the hydrolysis of MPE with sodium hydroxide was demulsified by mixing it with 50 percent water and the amounts of triethanolamine citrate and

TABLE 7

Demulsification of Caustic-Hydrolyzed MPE Oil with Jefferson Amine C-6 Citrate

| | Demulsification | | | Neutralization | |
|---|---|---|---|---|---|
| | Amine C-6 | | | | |
| Sample | Citrate (ppm) | Demulsification (ppm) | pH | Neutralizer (ppm) | Demulsification (ppm) |
| 1 | 7500 | Jeffamine D-2000 (1000) | 4.4 | Jeffamine D-400 (1250) | — |
| 2 | 6000 | Jeffamine D-2000 (1000) | 5.0 | Jeffamine D-230 (1000) | — |
| 3 | 4000 | Jeffamine D-2000 (1000) | 6.1 | Jeffamine D-400 (1000) | — |
| 4 | 7500 | Jeffamine BUD-2000 (1000) | 4.2 | Jefferson Amine C-6 | — |
| 5 | 7500 | Jeffamine DU-3000 (2500) | 4.4 | Jefferson Amine C-6 | — |
| 6 | 7000 | Jeffamine D-2000 (1000) | 7.2 | none | — |
| 7 | 4000 | Jeffamine D-2000 (1000) | 8.4 | none | — |
| 8 | 7000 | none | 7.3 | Jeffamine D-400 (2500) | — |
| 9 | 6000 | Jeffamine D-2000 (1000) | 4.6 | Jefferson Amine C-6 (2500) | Jeffamine D-2000 (1000) |

TABLE 8

| | | | | Desalter Test | | | | | |
|---|---|---|---|---|---|---|---|---|---|
| | | | | | Minutes | | | H₂O, % | |
| Sample | pH | Water Quality | Interface Quality | BC | 5 | 10 | 15 | Before | After |
| 1 | 8.0 | clear, yellow | no PAD | 0 | 4 | 5 | 5 | 0.30 | 0.45 |
| 2 | 8.3 | clear, tan | no PAD | 0 | 4— | 5 | 5+ | 0.47 | 0.64 |
| 3 | 8.7 | clear | no PAD | 0 | 4+ | 5+ | 5+ | 0.14 | 0.46 |
| 4 | 9.5 | hazy, yellow | no PAD | 1+ | 5+ | 6 | 6+ | .29 | 0.75 |
| 5 | 7.4 | clear, yellow | no PAD | 3 | 4— | 5— | 5+ | 0.30 | 0.40 |
| 6 | >7.0 | clear, yellow | no PAD | 1+ | 3+ | 4+ | 4+ | 0.15 | 0.65 |
| 7 | >7.0 | clear | no PAD | 0, | 4, | 5— | 5 | 0.36 | 0.56 |
| 8 | 7.5 | clear | no PAD | 0, | 1+ | 5 | 5+ | 0.32 | .43 |
| 9 | 8.1 | clear, yellow | no PAD | 4— | 3 | 4+ | 5 | 0.31 | 0.51 |

As the results show, demulsification can be effected either with or without demulsifiers at pH's ranging from 4.6 to 8.4. Neutralization with Amine C-6 both with and without a demulsifier, Jeffamine D-2000), is demonstrated as well as the use of Jeffamines D-230 and D-400 as a combination of both neutralizer and demulsifier.

EXAMPLE 7

Triethanolamine citrate having a pH of about 4 was prepared by dissolving 40 gm of citric acid in 100 gm of the demulsifiers shown in Table 9 followed by heating to 100°–140° F. (38°–60° C.). After separating the brine and determining its pH, the oil phase was neutralized by mixing it with 50 percent water and the amounts of organic bases and demulsifiers also shown in Table 9. The amounts of reactants, in ppm, is based upon undiluted oil obtained from the hydrolysis. The resulting oil was then subjected to the simulated desalter and centrifuge tests, the results of which are shown in Table 10.

TABLE 9

Demulsification and Neutralization of Oil Obtained from Hydrolyzed MPE

| | Demulsification | | | Neutralization | |
|---|---|---|---|---|---|
| Sample | Citrate (ppm) | Demulsifier (ppm) | pH | Neutralizer (ppm) | Demulsifier (ppm) |
| 1 | 4000 | Jeffamine D-2000 (1000) | 7.7 | — | — |
| 2 | 4000 | Jeffamine D-2000 (1000) | 7.6 | — | — |
| 3 | 3000 | Jeffamine D-2000 (1250) | 8.9 | — | — |
| 4 | 3000 | Jeffamine D-2000 (2500) | 9.2 | — | — |
| 5 | 7500 | Jeffamine D-2000 (1000) | 5.6 | Jefferson Amine C-6 | — |

TABLE 10

| | | | | Simulated Desalter Test | | | | |
|---|---|---|---|---|---|---|---|---|
| | | | | WOC | WC | | | Centrifuge Test |
| | | Water | Interface | Coalescense | (+)Coalescense | Water-in-oil, % | | Water-in-oil, % |
| Sample | pH | Quality | Quality | H₂O, ml | H₂O, ml | Before | After | After |
| 1 | — | clear | none | 1 | 6— | 0.28 | 0.52 | 0.39 |
| 2 | — | clear | none | 2— | 6— | 0.30 | 0.52 | 0.41 |
| 3 | — | clear | none | 1— | 5 | 0.38 | 0.60 | 0.44 |
| 4 | — | clear | none | 1— | 5 | 0.35 | 0.62 | 0.42 |

TABLE 10-continued

| | | | Simulated Desalter Test | | | | Centrifuge Test |
| | | | WOC | WC | | | |
| | Water | Interface | Coalescense | (+)Coalescence | Water-in-oil, % | | Water-in-oil, % |
| Sample | pH | Quality | Quality | H₂O, ml | H₂O, ml | Before | After | After |
|---|---|---|---|---|---|---|---|---|
| 5 | 7.7 | clear | none | 1— | 5 | 0.50 | 0.62 | 0.46 |

As the results show, demulsification was effected at pH values ranging between 5.6 and 9.2. Neutralization of the acidic oil was effected with Jefferson Amine C-6.

EXAMPLE 10

Field demulsifications were conducted on MPE, which had been stored in a tank farm for over one year, by diluting the MPE with an equal volume of water, mixing it with 0.6 volume percent sodium hydroxide, based on volume of undiluted MPE, passing the mixture through a heater-treater at 170° F. (77° C.), and then transferring it to a storage tank. After 48 hours of retention, the hydrolyzate (lower aqueous phase) was separated and the oil isolated. The recoveries of oil ranged between 36 and 55 volume percent, based on volume of undiluted MPE.

The caustic hydrolyzed oil was then demulsified in 300 barrel batches by mixing it with 1000 ppm of Jeffamine D-2000 and sufficient Jefferson Amine C-6 citrate, described in Example 6, to reach the pH's tabulated in Table 10. The pH's were determined on the aqueous phase that separated after washing the oil-citrate mixture with 50 percent water. After pH adjustment, the tank was placed in retention and the lower phase consisting of aqueous citrates withdrawn over a 48 hour period.

The oil phase was then neutralized by mixing it with the amounts of Jeffamine D-2000 and either Jeffamine D-400 or Jefferson Amine C-6 as shown in Table 10 until the pH of the aqueous phase, which separated after washing the mixture with 50 percent water, had a pH of about 7.5–8.5. The amounts of reactants, in ppm, are based upon undiluted oil obtained by hydrolysis. The neutralized oil was then passed through a heater-treater with 50 percent water at 160° F. (71° C.). Siphon water from the heater-treater was sampled and the pH determined as shown in Table 11.

After neutralization and washing, the oil was placed in retention for 48 hours after which samples were taken for the desalter tests. The results of the desalter tests are shown in Table 11.

What is claimed is:

1. A process for the demulsification of a middle phase emulsion of a crude oil emulsion produced by a surfactant flood comprising contacting the middle phase emulsion with a water-soluble alkali metal hydroxide selected from the group consisting of sodium hydroxide and potassium hydroxide in an amount sufficient to cause demulsification of the emulsion.

2. The process of claim 1 wherein the hydroxide is utilized in an amount of from about 0.05 to about 5.0 weight percent based on volume of the emulsion being treated.

3. The process of claim 1 wherein the hydroxide is added in an amount sufficient to obtain a pH of at least about 10.

4. The process of claim 3 wherein water is added in an amount equivalent to at least about 50 volume percent based on volume of the original emulsion.

5. The process of claim 1 wherein an additive selected from the group consisting of hydrogen peroxide and a tetraalkylammonium salt having at least one alkyl group containing 1–25 carbon atoms, is added in an amount sufficient to accelerate the rate of separation of the emulsion.

6. A process for the demulsification of a middle phase emulsion of a surfactant produced crude emulsion comprising contacting the middle phase emulsion with from about 0.05 to about 5.0 weight percent of a hydroxide selected from the group consisting of sodium hydroxide and potassium hydroxide, diluting the mixture with at least about 50 volume percent water, based on volume of original emulsion, and heating the mixture to a temperature of from about 75° F. (24° C.) to about 400° F. (204° C.) for a sufficient time to cause the emulsion to separate into at least two phases, one of which is an oil phase and separating the oil phase.

7. The process of claim 6 wherein the oil phase is separated and is thereafter contacted with an acid selected from the group consisting of a carboxylic acid selected from the group consisting of tartaric, mucic, citric, ethylenediaminetetraacetic, nitrilotriacetic, gluconic, lactic, glycolic and acetic acid; amine salts of said carboxylic acids; sulfuric acid and phosphoric acid in an amount sufficient to obtain a pH of less than about 8 and allowing the mixture to separate into at least two phases, one of which is an oil phase and separating the oil phase.

TABLE 11

| | Demulsification | | Neutralization | | | Heater-Treater | | | Desalter Test | |
| | | Amine C-6 | D-2000 | D-400 | Amine C-6 | Siphon | Temp. | Yield | H₂O, % | |
| Sample | pH | Citrate, bbls | ppm | ppm | ppm | Water, pH | °F. (°C.) | % | Before | After |
|---|---|---|---|---|---|---|---|---|---|---|
| 1 | 5.9 | 7.4 | 250 | 1000 | — | 8.2 | 160 (71) | 90.6 | 0.11 | 0.42 |
| 2 | 6.8 | 5.6 | 500 | 1750 | — | 8.3 | 160 (71) | 91.3 | 0.21 | 0.59 |
| 3 | 7.2 | 4.3 | 750 | 1500 | — | 8.1 | 160 (71) | — | 0.15 | 0.25 |
| 4 | 6.1 | 6.5 | 750 | 2250 | — | 8.1 | 160 (71) | — | 0.13 | 0.37 |
| 5 | 6.0 | 7.1 | 750 | 2250 | — | 8.0 | 160 (71) | — | 0.04 | 0.33 |
| 6 | 5.8 | 6.0 | 1000 | — | 7000 | 8.1 | 160 (71) | — | 0.13 | 0.30 |
| 7 | 6.8 | 4.0 | 1000 | 2250 | — | 8.1 | 160 (71) | — | 0.13 | 0.44 |
| 8 | 6.9 | 4.0 | 1000 | — | — | 7.3 | 160 (71) | — | 0.13 | 0.41 |
| 9 | 7.1 | 4.2 | 1000 | — | 2000 | 7.5 | 160 (71) | — | 0.33 | 0.38 |
| 10 | 6.8 | 4.2 | 1000 | — | 2000 | 8.9 | 160 (71) | — | 0.17 | 0.60 |
| 11 | 6.0 | 4.0 | 1000 | — | 2000 | 8.0 | 160 (71) | — | 0.39 | 0.47 |
| 12 | 7.1 | 5.0 | 1000 | 2000 | — | 8.8 | 160 (71) | — | 0.33 | 0.79 |

8. A process for the demulsification of a middle phase emulsion of a surfactant produced crude oil emulsion comprising:
(a) contacting the middle phase emulsion with a water-soluble alkali metal hydroxide selected from the group consisting of sodium hydroxide and potassium hydroxide in an amount of from about 0.05 to about 5 weight percent based on volume of the middle phase emulsion and allowing the mixture to separate into phases one of which is an oil phase;
(b) separating the oil phase;
(c) contacting the oil phase with an acid selected from the group consisting of a carboxylic acid selected from the group consisting of tartaric, mucic, citric, ethylenediaminetetraacetic, nitrilotriacetic, gluconic, lactic, glycolic and acetic acid; amine salts of said carboxylic acids; sulfuric acid and phosphoric acid in an amount sufficient to obtain a pH of less than about 8 and allowing the mixture to separate into at least two phases, one of which is an oil phase; and
(d) separating the oil phase of step (c).

9. A process for the demulsification of a middle phase emulsion of a crude oil produced by a surfactant flood comprising:
(a) contacting the middle phase emulsion with a water-soluble metal hydroxide selected from the group consisting of sodium hydroxide and potassium hydroxide in an amount of from about 0.05 to about 5 weight percent based on volume of middle phase emulsions;
(b) heating the mixture of step (a) to a temperature of from about 75° F. to about 400° F. and allowing the mixture to separate into phases wherein one of the phases is an oil phase;
(c) separating the oil phase;
(d) contacting the oil phase of step (c) with an acid selected from the group consisting of a carboxylic acid selected from the group consisting of tartaric, mucic, citric, ethylenediaminetetraacetic, nitrilotriacetic, gluconic, lactic, glycolic and acetic acid and amine salts of said carboxylic acids; sulfuric and phosphoric acid in order to obtain a pH of less than about 8 and allowing the mixture to separate into phases wherein one phase is an oil phase; and
(e) separating the oil phase from the mixture of step (d).

10. The process of claim 8 or 9 wherein the amine salt of a carboxylic acid is obtained by reacting said carboxylic acid, either prior to or concurrently with contacting the acid with the oil phase, with an amine selected from the group consisting of monoethanolamine, diethanolamine, triethanolamine, morpholine and polyalkyloxyamines having an average molecular weight of from about 200 to about 3500 and having the formula:

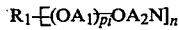

wherein:
$R_1$ is selected from the group consisting of hydrogen, an alkyl, an aryl, an alkylaryl, a heterocyclic and N,N' diurea;
$-(OA_1)-$ is an alkyleneoxy substituent;
$OA_2N$ is a nitrogen-containing alkyleneoxy group;
n is an integer having a value of at least 1 which denotes the number of $OA_1OA_2N$ groups attached to $R_1$;
p is 0 an integer denoting the number of $-(OA_1)-$ units in each of the n groups attached to $R_1$; and
i is a subscript which distinguishes between the individual p groups of each of the n groups.

11. The process of claim 10 wherein the oil following demulsification with the carboxylic acid or an amine salt of a carboxylic acid is acidic, and the oil phase is thereafter treated with a water-soluble amine of claim 10 and water in order to obtain a pH of between about 6 and about 9.

12. The process of claim 10 wherein the polyalkyloxyamine has an $R_1$ selected from the group consisting of 1,1,1-trimethylene propane, 1,1,1,1-tetramethylene methane, 1,2-propenyl, 1,2-ethenyl and N,N'-diurea; wherein $-(OA_1)-$ and $-(OA_2)-$ are each selected from the group consisting of an ethyleneoxy, propyleneoxy and butyleneoxy; and N is a nitrogen-containing substituent selected from the group consisting of amine, methylamine, dimethylamine, cyanoethylamine, hydroxyethylamine, morpholine, imidazole and ureide; wherein n has a value of 1 to 4 and wherein the average number of $-(OA_1)-$ groups is from 0 to about 25 and has an average moleclar weight of from about 200 to about 3500.

13. The process of claim 11 wherein the water-soluble amine has demulsification properties and is a polyalkyloxyamine wherein the polyalkyloxyamine has an $R_1$ selected from the group consisting of 1,1,1-trimethylene propane, 1,1,1,1-tetramethylene methane, 1,2-propenyl, 1,2-ethenyl and N,N'-diurea; wherein $-(OA_1)-$ and $-(OA_2)-$ are each selected from the group consisting of an ethyleneoxy, propyleneoxy and butyleneoxy; and N is a nitrogen-containing substituent selected from the group consisting of amine, methylamine, dimethylamine, cyanoethylamine, hydroxyethylamine, morpholine, imidazole and ureide; wherein n has a value of 1 to 4 and wherein the average number of $-(OA_1)-$ groups is from 0 to about 25 and has an average molecular weight of from about 200 to about 3500.

14. The process of claim 12 wherein the carboxylic acid is citric acid.

15. The process of claim 13 wherein $R_1$ is 1,1,1-trimethylene methane, $-(OA_1)-$ and $-(OA_2)-$ are each 2-propyleneoxy, N is a nitrogen-containing substituent which is a secondary amine, n is 3, the average number of $-(OA_1)-$ groups in the polyalkyloxyamine is from about 0.75 to about 2.5 and the average molecular weight of the polyalkyloxyamine is from about 200 to about 400.

* * * * *

UNITED STATES PATENT AND TRADEMARK OFFICE
CERTIFICATE OF CORRECTION

PATENT NO. : 4,439,345
DATED : March 27, 1984
INVENTOR(S) : Roy B. Duke

It is certified that error appears in the above-identified patent and that said Letters Patent are hereby corrected as shown below:

Col. 6, line 52: Delete "-OA$_1$-" and insert --(OA$_1$)--.
Col. 8, line 8 & 9: Delete "in situ" and insert --_in situ_--.
Col. 10, line 54: Delete "The" and insert --This--.
Col. 12, line 9: Before "60°" insert -- 38- --.
Col. 16, line 27: Following "atoms" delete --,--.
Col. 17, line 34: Following "75°F." insert --(24°C.)-- and following "400°F." insert --(204°C.)--.

Signed and Sealed this

Twenty-first Day of August 1984

[SEAL]

Attest:

GERALD J. MOSSINGHOFF

Attesting Officer

Commissioner of Patents and Trademarks